United States Patent Office 3,647,656
Patented Mar. 7, 1972

3,647,656
METHOD OF PREPARING α SUBSTITUTED β, γ UNSATURATED LACTONES FROM ALKOXYFURANS
Rangaswamy Srinivasan and Hiroyuki Hiraoka, Ossining, N.Y., assignors to International Business Machines Corporation, Armonk, N.Y.
No Drawing. Filed Apr. 9, 1969, Ser. No. 814,791
Int. Cl. B01j 1/10
U.S. Cl. 204—158         8 Claims

ABSTRACT OF THE DISCLOSURE

Alpha substituted β, γ unsaturated lactones having the general formula

where R is an alkyl or aromatic group, is prepared. An alkyl or aromatic substituted alkoxyfuran is irradiated in the presence of actinic radiation either in the vapor phase or in solution.

BACKGROUND OF THE INVENTION

This invention relates to a method of converting alkoxyfurans into alpha substituted beta, gamma unsaturated lactones; more specifically this invention relates to a photolytic rearrangement of alkoxyfurans to produce alpha substituted beta, gamma unsaturated lactones.

DESCRIPTION OF THE PRIOR ART

Alpha substituted lactones are of interest for their biological activity. For example, these materials are used for the selective inhibition of the growth of animal tissues, antibiotic activity, inhibition of the germination of seeds and of plant growth, fish poison, insecticidal activity, cardiac activity, anthelmintic and hemorraphic activity. A great number of natural products, e.g., digitalis, which are valued for their cardiac activity are known to contain unsaturated α lactones as one of their major characteristics.

In the past, alpha substituted beta, gamma unsaturated lactones were prepared by wet chemical techniques with great difficulty as described by L. J. Haynes, Quarterly Review 2 46 (1948). These compounds are difficult to prepare by conventional chemical syntheses because they are anhydrides of the enolic form of an aldehydic acid. They have been prepared from keto acids as described in the publication by F. A. Kuehl, et al., Chemical Society (London) vol. 197–2914, page 2213, 1950. More recently, α allyl substituted lactones have been prepared by reacting a lactone with an allyl halide. While this process gives good yields of the α substituted lactone, the reaction must be carefully controlled in order to prevent polymerization products from forming.

SUMMARY OF THE INVENTION

In accordance with an aspect of the invention, there is provided a process for preparing α substituted β, γ unsaturated lactones. An alkoxyfuran having the general formula

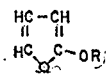

where R is a straight chain or cyclic alkyl radical having from 1 to 10 atoms, such as methyl, ethyl, isopropyl, octyl, cyclohexyl and the like or an aromatic radical, such as, the phenyl, naphthyl radicals, etc., is exposed to actinic radiation in the vapor phase or in solution. The alkoxyfuran is thereby photoisomerized to the corresponding α substituted β, γ unsaturated lactones. The product is separated from the reaction mixture by gas chromatography and is obtained having a purity of better than 98%. The photoisomerization is characterized by the following reaction:

OBJECT OF THE INVENTION

An object of the invention is to provide an improved method of preparing α substituted β, γ unsaturated lactones.

DESCRIPTION OF THE PREFERRED EMBODIMENTS

The object is achieved by the novel process which comprises exposing an alkoxyfuran to ultraviolet radiation having a wavelength of from about 2000 A. to about 3200 A.

The starting materials are alkoxyfurans having the general formula

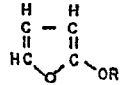

where R is an alkyl or aryl including arylalkyl and alkaryl groups or radicals. Preferred R groups are alkyls having from 1 to 10 carbon atoms and aryls having up to 10 carbon atoms. Illustrative of preferred R groups are methyl, ethyl, propyl, isopropyl, n-butyl, sec-butyl, tert-butyl, the isomeric pentyl, hexyl, heptyl, octyl, nonyl, decyl, cyclopentyl and cyclohexyl radicals. Preferred aromatic R groups include phenyl, benzyl, tolyl, xylyl, alpha-phenylethyl and naphthyl radicals.

In the process of the invention the alkoxyfuran is exposed to any actinic radiation source. However, for the purposes of this invention, the use of mercury light sources of low pressure is preferred. Mercury lamps of this type are represented by the conventional germicidal lamps which are inexpensive and are readily available,. High pressure mercury arc lamps such as the 1000 watt mercury lamp may also be used.

While any mercury light sources having ultraviolet radiation less than 3200 A. can be used, the preferred source is one having a strong 2537 A. Hg lines radiation. The light source employed in the process of this invention was a bank of sixteen commercially available General Electric G8T5 lamps placed circularly around the reaction cell in which the process is carried out. In this manner absorbed intensities of the order of $10^{15}$–$10^{17}$ quanta/sec at 2573 A. were obtained in the reaction cell.

The photoisomerization of the alkoxyfuran may occur either as a vapor or in solution. The alkoxyfurans are relatively volatile substances, thus require little heat to transform them into the vapor phase. Solutions of the alkoxyfurans can be prepared by dissolving them in inert hydrocarbon solvents or in ether.

The following examples are illustrative of the preferred embodiments of the invention and are not to be considered as limiting thereto.

EXAMPLE I

A reaction vessel containing a 5% solution of 2-methoxyfuran in ether or pentane is placed in the center of a bank of mercury lamps and is irradiated for about 12 hours. The solvent is then removed by distillation. The produce α-methyl-β,γ-butyryl lactone is separated from the unreacted starting material contained in the residue, by gas chromatography. The recovered product is a pale yellow liquid. Relative retention time against 2-methoxyfuran in a 20% 2-meter Ucon Oil column at 57° C. was 2.43.

The identity of the product (which has hitherto not been described) was established from the following considerations:

Mass spectrum: Parent peak at $m/e=98$
Infrared spectrum: Intense absorptions at 1800, 1150, and 1120 cm.$^{-1}$; medium absorptions at 1370 cm.$^{-1}$
Nuclear magnetic resonance (NMR): 1.30δ (Doublet)–3H; 3.0δ (Multiplet)–H; 6.7δ (Multiplet)–1H;

EXAMPLE II

The process of Example I was repeated in the vapor phase. The 2-methoxyfuran, placed in a cylinder, is heated to a temperature of about 80° C. to cause the sample to vaporize. The recovered product was found to have the same characteristics as that in Example I.

EXAMPLE III

A 5% solution of 2-phenoxyfuran

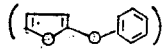

in cyclohexane was treated as in Example I. A product was recovered by gas chromatography and identified as α-phenyl-β,γ-butyryl lactone

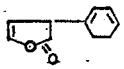

Mass spectrum: Parent peak at $m/e=160$
Infrared spectrum: Intense absorption at 1800 cm.$^{-1}$ The relative retention time against 2-phenoxyfuran in 20% 2-meter Apiezone column at 135° C. was 1.80. The product was recovered as a pale yellow liquid by gas chromatography.

While the invention has been particularly described with reference to specific examples thereof, it will be understood by those skilled in the art that various changes in procedures may be made therein without departing from the spirit and scope of the invention.

What is claimed is:

1. A method of preparing α substituted β, γ-unsaturated lactones comprising the step of:
   exposing an alkoxyfuran compound having the general formula

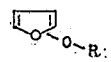

where R is selected from the group consisting of alkyl radicals having up to 10 carbon atoms, and aryl radicals selected from phenyl, benzyl, tolyl, xylyl, alpha-phenylethyl and napththyl radicals, to ultra violet radiation.

2. The method of claim 1 wherein R is a methyl radical.

3. The method of claim 1 wherein R is a cyclohexyl radical.

4. The method of claim 1 wherein R is a phenyl radical.

5. The method of claim 1 wherein said alkoxyfuran compound is exposed to ultra-violet radiation less than 3200 A.

6. The method of claim 1 wherein said alkoxyfuran compound is exposed to the 2537 A. Hg line of the ultra-violet spectrum.

7. The method of claim 1 wherein vapors of said alkoxyfuran are exposed to said ultra-violet radiation.

8. The method of claim 1 wherein a solution of said alkoxyfuran is exposed to said ultra-violet radiation.

References Cited

UNITED STATES PATENTS 2,513,615  7/1950  Barnett _____ 204—158 R

HOWARD S. WILLIAMS, Primary Examiner